Dec. 31, 1929. W. H. SAUVAGE 1,741,739
SLACK ADJUSTER
Filed Feb. 9, 1925
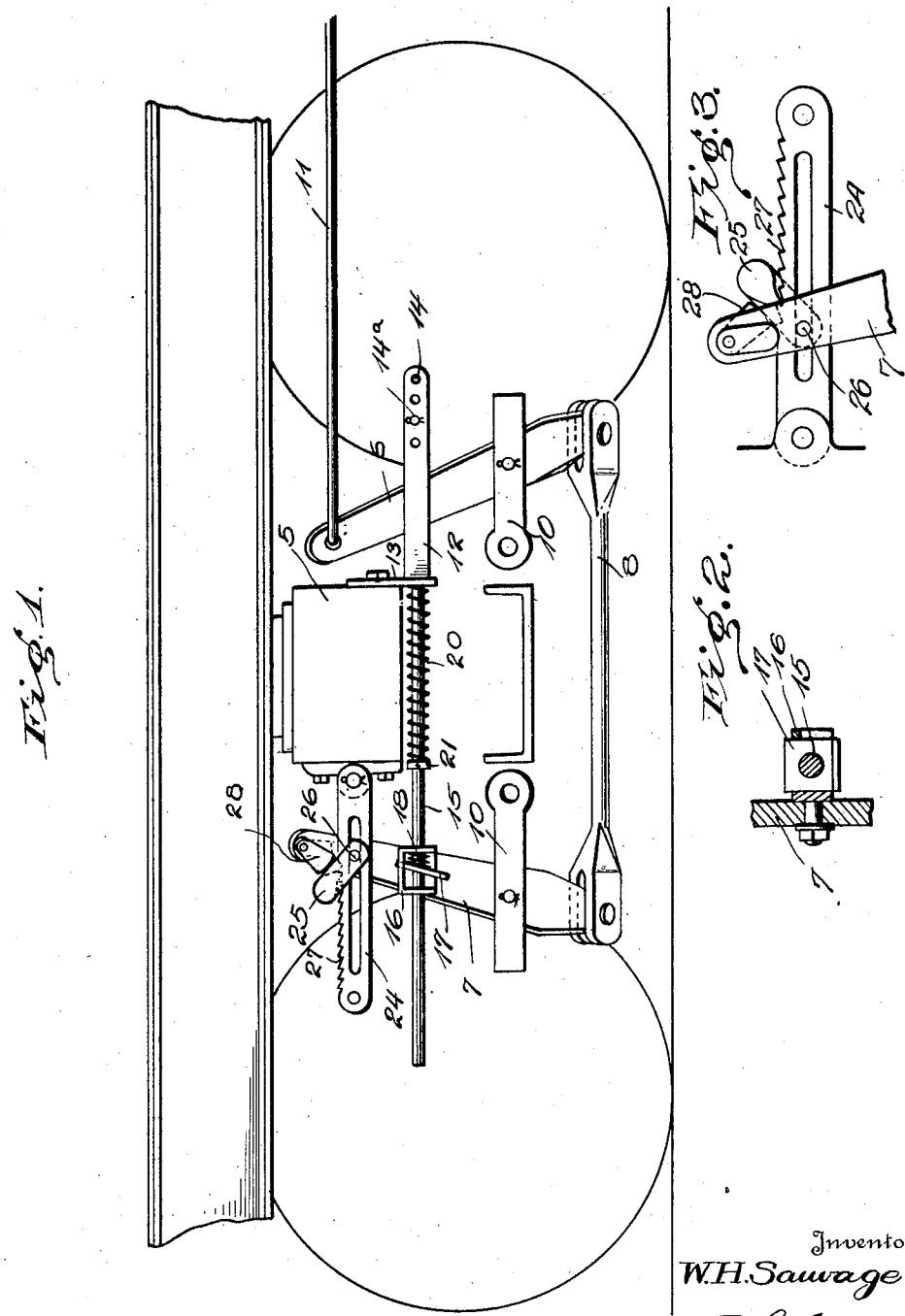
Inventor
W. H. Sauvage
By
Attorney Patented Dec. 31, 1929

1,741,739

UNITED STATES PATENT OFFICE

WILLIAM H. SAUVAGE, OF NEW YORK, N. Y., ASSIGNOR, BY MESNE ASSIGNMENTS, TO GOULD COUPLER COMPANY, OF NEW YORK, N. Y.

SLACK ADJUSTER

Application filed February 9, 1925. Serial No. 7,958.

This invention relates to slack adjusters and more particularly to automatic slack adjusters particularly adapted for use in connection with the truck brake rigging of railway cars.

One of the objects of the present invention is to provide an improved slack adjuster which will be simple and practical in construction and reliable and efficient in operation.

A further object is to provide an automatic slack adjuster of the above character having a special type of mechanism associated with the dead lever for taking up the excess travel, and so constructed as to prevent a releasing or actuation thereof when the car is subjected to sudden shocks as occurs in switching.

A further object is to provide an automatic slack adjuster of the above general character having relatively few parts which may be inexpensively manufactured, assembled and applied to various types of truck brake rigging now in general use without material alteration.

Other objects will be in part obvious from the annexed drawings and in part indicated in connection therewith by the following analysis of this invention.

The invention accordingly consists in the features of construction, combination of parts, and in the unique relations of the various members and in the relative proportioning and disposition thereof, all as more completely outlined herein.

To enable others skilled in the art so fully to comprehend the underlying features thereof that they may embody the same by numerous modifications in structure and relation contemplated by this invention, drawings depicting a preferred form have been annexed as a part of this disclosure, and in such drawings like characters of reference denote corresponding parts throughout all the views, in which—

Figure 1 is a side elevational view partly in section showing such parts of the truck brake rigging and slack adjuster mechanism as are necessary to fully understand the same;

Figure 2 is a detail view of one of the parts.

Figure 3 is a detail view of the ratchet and associated take-up mechanism looking from the opposite direction to that illustrated in Figure 1, the weighted member 28 being represented in locking position.

Referring now to the drawings in detail, 5 indicates a truck bolster of the usual type, having associated therewith a live lever 6, a dead lever 7, and a connecting rod 8 at their lower ends. Both levers are provided with brake beams 10 adapted to carry the usual brake shoes for engaging the peripheries of the wheel. The upper part of the live lever is connected with a pull rod 11 which is actuated by any suitable source of power for applying the brakes. This lever travels in a slotted member 12 supported from a bracket 13 at one side of the truck bolster 5, and is provided near its ends with a series of holes 14 approximately an inch apart, in one of which is inserted a pin $14^a$, thereby to adjust the travel of the truck lever before actuation of the slack adjuster takes place. Thus, the travel may be set for, say, six, seven or eight inches as desired by spacing the lever 6 from the pin $14^a$ the desired amount of the usual piston travel. If excess travel occurs beyond this predetermined amount, then the slack adjuster is operated as will hereinafter be more fully described to take up the excess travel and thereby insure uniform piston travel. This is accomplished by means of an extension 15 to the part 12 which passes through the bracket 13 and a housing 16, mounted on the dead lever 7, and provided with a gripping dog 17 normally held in canted relation by means of a spring 18 within the housing. This dog, which is of well known construction, consists of a piece of steel plate having an aperture therein, through which the rod 15 passes. The edges of the aperture are case-hardened and adapted to bite into the rod, and hold the same when the rod is actuated in one direction, yet permitting movement of the rod in the opposite direction.

A spring 20 is coiled about the rod 15 and abuts the bracket 13 at one end and an adjustably mounted collar 21 at its other end. Thus, when excess travel takes place, the live lever coacts with the pin 14ª in one of the holes 14, thereby to cause a bodily movement of the rod 12—15 towards the right, it being free to move through the dog 17 in that direction, and thereby compress the spring 20. On release of the brakes, this spring expands and the live lever drops back to normal position and causes the dog 17 through its associated housing 16 which is mounted upon the upper end of the dead lever 7, to urge this lever bodily towards the left. This movement constitutes a temporary take up and holding means and the slack is permanently taken up at the upper end of the dead lever.

It will be noted that the upper end of this lever has a slidable connection with a duplex arm 24 mounted on the truck bolster 5. This arm 24 provides means for connecting the upper end of the dead lever to the truck or bolster 5 thereof. A gravity actuated pawl 25 is pivotally mounted on the lever at 26 and coacts with a ratchet 27 to move the lever progressively towards the left as the slack is taken up. At the top of the dead lever 7 is a loosely mounted weighted member 28 engaging the pawl 25, and acting by its weight to prevent accidental release of the pawl 25, as might occur during the take up operation or when the car is subjected to sudden shock. Thus, a sudden shock tending to cause an upward swinging movement of the pawl 25 will also cause a swinging movement of this member 28 to one side, thereby to engage the upper surface of the pawl and prevent a rising thereof.

In this manner, the slack adjuster mechanism above described acts to temporarily take up the excess slack due to the wear of the parts upon each application of the brakes and this slack is then permanently held whereby a uniform piston travel upon brake actuation is at all times maintained.

It will thus be seen that the present invention comprises a simple and practical slack adjuster mechanism which will be automatic in its operation, insure uniform piston or operation travel and is well adapted to accomplish among others all of the objects and advantages herein set forth.

Without further analysis the foregoing will so fully reveal the gist of this invention that others can by applying current knowledge readily adapt it for various applications without embodying certain features that, from the standpoint of the prior art, fairly constitute essential characteristics of the generic or specific aspects of this invention, and, therefore, such adaptations should and are intended to be comprehended within the meaning and range of equivalency of the following claims.

I claim:

1. In a truck, in combination, live and dead levers, an actuating member connected to the live lever and means for connecting the upper end of the dead lever to the truck, temporary take up and holding means below said connecting means joining the upper parts of the live and dead levers and adapted to be actuated on excess travel, resilient means tending to retain said holding means to normal position, and permanent take up and holding means associated with the connecting means for said dead lever.

2. In a truck, in combination, live and dead levers, an actuating member connected to the live lever and means for connecting the upper end of the dead lever to the truck, temporary take up and holding means connecting the upper parts of the live and dead levers adapted to be actuated on excess travel, and permanent take up and holding means associated with the connecting means for said dead lever, said last mentioned means comprising a rack, and a pawl carried by the dead lever and normally engaging said rack, said rack being slotted for slidable engagement with respect to said dead lever.

3. In a truck, in combination, live and dead levers, an actuating member connected to the live lever and means for connecting the upper end of the dead lever to the truck, temporary take up and holding means connecting the upper parts of the live and dead levers and adapted to be actuated on excess travel, and permanent take up and holding means associated with the connecting means for said dead lever, said last mentioned means comprising a rack, a pawl carried by the dead lever normally engaging said rack, and means associated with the pawl for preventing accidental release thereof.

4. In a truck, in combination, live and dead levers, an actuating member connected to the live lever, and means for connecting the upper end of the dead lever to the truck, temporary take up and holding means connecting the upper parts of the live and dead levers adapted to be actuated on excess travel, and permanent take up and holding means associated with the connecting means for said dead lever, said last mentioned means comprising a rack, a pawl carried by the dead lever and normally engaging said rack, and means associated with the pawl for preventing accidental release thereof, said means comprising a loosely mounted swinging member adapted to coact with the upper surface of the pawl.

5. In an apparatus of the character described, in combination, a live lever, a dead lever, a rod connecting the upper parts of said levers and including means for permitting a predetermined movement of the live lever without actuating the slack adjuster, a spring associated with said rod adapted to be compressed on movement of the rod during excess travel of the live lever, means associated with the dead lever for temporarily taking up this excess travel, and means disposed above said rod and associated with the upper end of the dead lever for permanently absorbing this excess travel on release of the brakes.

6. In an apparatus of the character described, in combination, a live and dead lever positioned at opposite sides of the trunk bolster, a rod supported from the bolster having a lost motion connection with the live lever and a one-way connection with the dead lever, a spring associated with said rod and adapted to be compressed on excess travel of the live lever, temporary take up means including a holding dog for taking up the excess travel, and permanent take up and holding means actuated on release of the brakes by said temporary take up and holding means as said spring expands on release of the brakes.

Signed at New York city this 8th day of January, 1925.

WILLIAM H. SAUVAGE.